United States Patent Office 2,792,229
Patented May 14, 1957

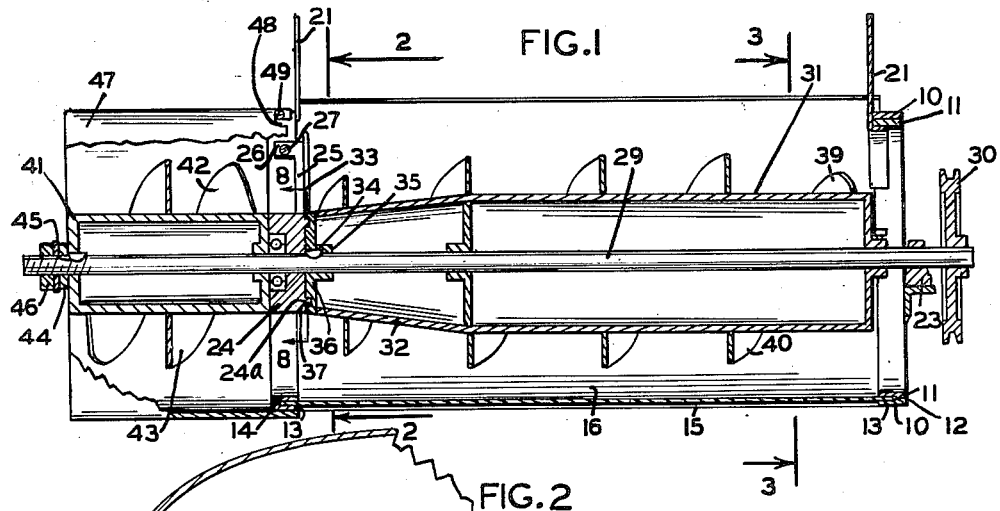

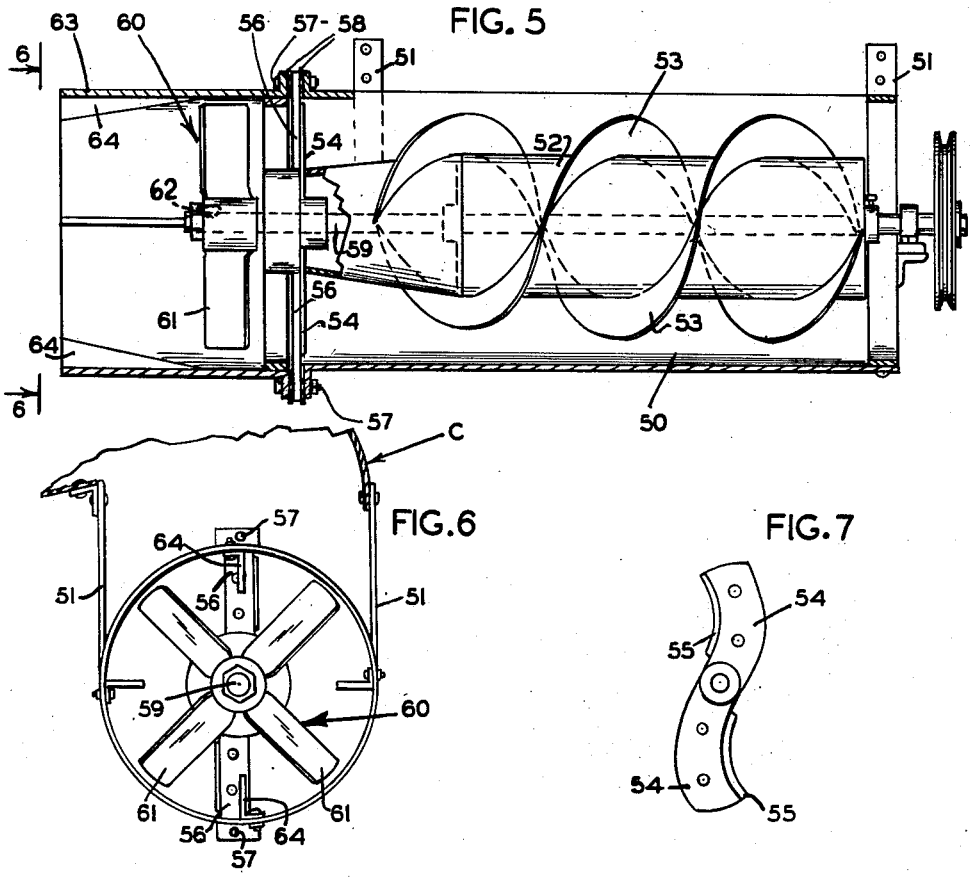

2,792,229

STRAW AND STALK COMMINUTER AND SCATTERER ATTACHMENT

George C. Berger, Erskine, and Albin O. Myrold, Crookston, Minn.

Application January 19, 1951, Serial No. 206,852

11 Claims. (Cl. 275—3)

This invention relates to combines and other harvesting machines which are used to remove and separate the grain, kernels, fruit, or natural food products from the stalks and straw and which normally discharge the stalks from the delivery end of the machine. It has particular relation to the disintegration and wide scattering of the disintegrated particles of stalks and straw continuously throughout the operation of the machine.

It is a general object of our invention to provide an improved stalk and straw disintegrating and scattering device adapted for use as an attachment or as standard equipment in various harvesting machines such as grain combines wherein provision in inherently made for direction and discharge of stalks and/or straw after preliminary handling of the crops.

A more specific object is to provide an improved stalk and straw disintegrating and scattering mechanism which will require a minimum amount of power to operate and which will require a minimum amount of structure for its construction to thereby substantially reduce the manufacturing and operating costs of the mechanism.

Another object is to provide an improved stalk and straw disintegrating and scattering mechanism which will effectively comminute the stalks and straw and thereafter positively propel the disintegrated particles in a direct lateral path with respect to the combine.

Another object is to provide a mechanism of the class described, the essential component parts of which are capable of being rotated at high speeds to facilitate the disintegrating and scattering action of the mechanism.

Another object of our invention is to provide a disintegrating and scattering assembly for combines or the like adapted to provide an improved and more efficient disintegrating action between its cooperating cutter elements as a result of their shape.

Another object is to provide an improved stalk and straw disintegrating and scattering assembly wherein an auger type conveyor is arranged transversely with respect to the discharge of the combine to convey the stalks and straw in a uniform flow into a set of rotary cutter elements and a set of cooperating fixed cutter elements, the auger having a pair of flights of spiral flanges disposed diametrically opposite to effectively balance the auger to permit rotation of the same at high speeds.

Another object is to provide a stalk and straw disintegrating and scattering assembly, the essential component parts of which may be mounted upon a single axis for rapid rotation and wherein said axis may be supported by a single pair of bearings.

Another object is to provide a stalk and straw disintegrating and scattering assembly wherein the scattering mechanism will require a minimum of power to effectively scatter the disintegrated particles over a wide area to the side of the combine.

Another object is to provide an assembly of the class described wherein a rotor body may be used to convey the stalks and straw discharged from the combine into a plurality of cooperating knives and wherein a second rotor body may be mounted on the same axis on the opposite side of the cutter elements to effectively scatter the disintegrated particles in a lateral path with respect to the combine.

A further object is to provide a stalk and straw disintegrating and scattering assembly having improved means for preventing dust and dirt from entering the bearings within which the assembly is mounted for rotation.

These and other objects and advantages of our invention will more fully appear from the following description made in connection with the accompanying drawings wherein like reference characters refer to the same or similar parts throughout the several views and in which:

Figure 1 is a rear elevational view of one embodiment of our invention with portions broken away to show the essential component parts and their construction.

Figure 2 is a vertical sectional view taken along line 2—2 of Figure 1 and showing one embodiment of our invention mounted across the discharge of the combine.

Figure 3 is a vertical sectional view taken along line 3—3 of Figure 1 showing the diametrical opposite disposition of the two pairs of flights of outwardly extending flanges on the auger type conveyor.

Figure 4 is a side elevational view showing the construction of one of the rotary cutter elements in detail.

Figure 5 is a rear elevational view of a second embodiment of our invention with portions broken away to show the essential component parts.

Figure 6 is a vertical sectional view taken along line 6—6 of Figure 5.

Figure 7 is a side elevational view of an additional type of knife which is used in the second embodiment shown in Figure 5, and Fig. 8 is an enlarged scale sectional view taken along line 8—8 of Fig. 1.

One embodiment of our invention may include as shown in Figures 1-4, a pair of circular metal rings, one 11 of which is of smaller diameter than the other 10. These rings 10 and 11 are rigidly secured to each other at their outer edge as at 12 thus forming an annular groove 13 therebetween. A second pair of rings indicated generally as 14 is also provided, these rings being constructed and arranged in a similar manner. The two sets of rings are maintained in rigid spaced relation with respect to each other by a plurality of elongated metal straps 15. A flexible metal sheet 16 is inserted in the slots 13 to extend a substantial portion of the distance around the rings and to form in conjunction therewith a structure resembling a trough as best shown in Figure 2. One end portion 17 of the metal sheet 16 is angularly bent to extend forwardly over the rear end portion of the discharge structure 18 of the combine indicated generally as C. The other end portion 19 of the metal sheet 16 is bent rearwardly to permit the resilient nature of the metal sheet to cause the same to engage the rear end of the combine C as at 20. Thus the metal sheet 16 acts as a removable housing for the frame structure consisting of spaced ring members and the connecting straps 15. Secured to each of the sets of rings is a supporting plate 21 which is adapted to be secured to the rear end portion of the combine C in any suitable manner such as by bolts 22. The entire frame structure described above is of a length substantially equal to the width of the discharge of the combine C and is adapted to be mounted transversely of and slightly below the same.

Rigidly mounted on the rings 10 and 11 is a bearing 23. Also rigidly mounted between the opposite sides of the rings 14 is a bearing 24. This bearing 24 is actually a combined bearing and fixed cutter bar because the portions 25 which secure the bearing 24 in rigid position with respect to the rings 14 also serve as fixed knife holders. As best shown in Figures 2 and 4, the knife holders 25 are so formed with respect to the bearing 24 as to extend from opposite sides thereof and in opposite directions to provide what is in effect an S shaped knife holder. Each of the knife holders 25 has an angularly bent flange 26 at its outer end which is adapted to be secured to the rings 14 by bolts 27 or by welding. Each of the knife holders 25 is also provided with a removable knife 28.

Mounted within the bearings 23 and 24 and extending transversely of the discharge of the combine C and beyond the bearings themselves, is a shaft 29 having a drive wheel 30 secured at one of its ends to be connected with a source of rotary power. As best shown in Figure 1 this shaft 29 extends well beyond the bearing 24 and has mounted between the bearings in fixed relation thereto, a metal drum 31 one end portion 32 of which is frusto-conical in shape. This drum 31 extends the complete length of the shaft between the bearing 23 and a rotary knife holder 33. This rotary knife holder is keyed as at 34 to the shaft 29 and is positioned in close working relationship with the fixed knife holders 25. The frusto-conical portion 32 is cut out as at 35 to insure that the drum will extend to a position where it abuts against the mounting for the rotary knife holder 33 to prevent stalks and straw from becoming engaged therebetween. The hub portion 36 of the rotary knife holder 33 has an annular groove 37 formed therein and adapted to receive a complementary annular rib 24a which is formed on the bearing 24. This rib 24a and groove 37 cooperate to prevent dust and dirt from working downwardly into the bearing 24 and ruining the same.

The rotary knife holder 33 is also generally S shaped as best shown in Figure 4. The rotary knife holder 33 and the combined bearing 24 and knife holders 25 are almost identical in shape with the exception that the fixed knife holders 25 have the flanges 26 for the securement of the same to the rings 14. The rotary knife holder 33 is also adapted to receive and retain removable knife blades 38.

Fixedly secured to the drum 31 is a pair of outwardly extending spiral flanges 39 and 40 which extend throughout the length of the drum. As best shown in Figure 3, these flanges are disposed diametrically opposite to each other throughout their length.

Mounted on the shaft 29 on the opposite side of the cutter elements with respect to the drum 31 is a second drum 41 with a diameter substantially equal to the smaller end of the drum 31. This drum 41 also has a pair of flights of outwardly extending flanges 42 and 43 which are disposed diametrically opposite to each other and which extend throughout the length of the drum. The end of the shaft 29 is threaded to receive thereon a nut 44. When this nut 44 is tightened, the drum 31 and the rotary knife holder 33 are drawn tightly against the fixed knife holders 25 and the bearing 24. At the same time, the drum 41 is compressed tightly against the opposite side of the bearing 24. To insure that the nut 44 does not loosen, we have provided a washer 45 having an inwardly extending bar which cooperates with a slot provided therefor in the shaft 29 to prevent relative rotation of the same. A second nut 46 when tightened, will thus remain indefinitely in its proper tightened position.

Surrounding the drum 41 and its spiral flanges 42 and 43 is a removable housing 47 which is open on both its ends. This removable housing has a slot formed as at 48 which is adapted to receive a bolt 49 secured to the rings 14. Thus it can be seen that the housing 47 may be removed from the rings 14 by merely twisting the same in the necessary direction and then pulling outwardly.

Figures 5–7 show a second embodiment of our invention constructed in substantially the same manner as that shown in Figures 1–4 with the exception of a few features to be described hereinafter. As shown, the desired trough member indicated generally as 50 has a pair of straps 51 with which to secure the same to the discharge end of the combine C as shown in Figure 6. The drum 52 has a pair of diametrically oppositely disposed flanges 53 which serve to carry the stalks and straw into the cooperating cutter elements. In this embodiment, however, the rotary knife holder 54 is of a different shape, the leading and cutting edges of which extend forwardly in the direction of their rotation as at 55. The fixed cutter element 56 consists of a straight cutter bar adjustably mounted as best shown in Figure 5. The opposite ends of the cutter bar 56 are mounted with a loose fit upon bolts such as 57. The loose fit permits shims 58 to be driven on either side of the cutter bar 56 to adjust the orientation of the cutter bar with respect to the rotary cutter element 54.

Mounted on the shaft 59 on the opposite side of the cutter elements with respect to the drum 52 is a rotor indicated generally as 60 having non-variable pitched blades 61 shaped to propel disintegrated stalks and straw received from the cutter elements in a direct lateral path to the side of the combine. This rotor 60 is keyed to the shaft 59 as at 62 and is surrounded by a housing 63 having a plurality of tapered fins 64 mounted on its inner surface.

*Operation*

In operation, the drive wheel 30 is connected to a source of rotary power which will drive the shaft 29 at a high rate of speed in the neighborhood of 1500 R. P. M. As the straw is discharged from the combine C it is directed downwardly by the inherent structure of the combine as best shown in Figure 2 and deposited upon the rapidly revolving spiral flanges 39 and 40. These flanges carry the stalks and straw laterally with respect to the combine and into the cutter elements at the end of the drum 31. The rapidly rotating knife holder 33 with its removable knives 38 cooperates with the fixed knives 28 to efficiently comminute the stalks and straw and discharge the same into the path of the rapidly revolving flanges 42 and 43 on the drum 41. These flanges 42 and 43 carry the comminuted material in a direct lateral path and propel the same laterally only with respect to the combine. The high speed of the shaft 29 and the drum 41 is more than adequate to provide an efficient scattering operation for this material.

In the embodiment shown in Figures 5–7, the operation is quite similar except that the comminution is provided by a straight cutter bar and a rotary cutter element which is shaped so that its outer leading edge extends forwardly ahead of the rest of the cutting edge. These cutter elements comminute the material and discharge the same into the rapidly rotating rotor which propels the comminuted material directly laterally with respect to the combine. The fins 64 serve to redirect the comminuted material to cause the same to be propelled at right angles to the movement of the combine.

Our disintegrating and scattering mechanism has a number of advantages previously unknown in mechanisms of this type. We have found that in order to drive an auger type conveyor such as is utilized herein at high speeds, it is necessary in some manner to attain a very fine balance of the same. Previous mechanisms of this type, when operated at such high speeds, gave considerable trouble and rapid wearing as a result of the component parts not being carefully balanced. By utilizing dual spiral flanges disposed diametrically opposite with respect to each other on the drums 31 and 41, we have attained this essential balance so that our present structure may be revolved at extremely high speeds without danger of excessive wear.

By utilizing an auger type conveyor to discharge and scatter the comminuted material, we have been successful in reducing the required number of bearings for the common axis 29 to an absolute minimum, namely two. This is important for it insures that the shaft 29 will, at all times, be free of any tendency to bulge or bend as a result of stresses set up between the bearings when more than two bearings are used.

The annular groove 37 and the annular rib 24a are highly efficient in preventing dirt and dust from entering the bearing 24. That has been a difficult problem in the construction of mechanisms of this type, for when such dirt and dust is permitted to enter the bearings, rapid wear results shortly thereafter.

The shape of the respective cutter elements described above should be especially noted. By shaping each of these elements in a generally S shape, we have provided a maximum of efficiency in the disintegrating operation. It should be noted that the outer end portions of the fixed and rotary cutter elements engage each other first so that the result is that any material which is not immediately severed tends to slide toward the shaft 29 instead of outwardly beyond the outer ends of the cutter elements. The closer the stalks and straw move toward the bearing 24, the less leverage is exerted against the cutting operation. In other words, it requires less power to sever a given amount of straw with the portions of the knives adjacent the bearing 24 than it does with the outer end portions of the knives. Thus it can be seen that the tendency, as the result of the shape of the knives and their knife holders, is to direct the stalks and straw inwardly to a position where a minimum of power will be required to comminute the same.

It should also be noted that our disintegrating and scattering assembly effects the scattering operation with a minimum of power as a result of causing the comminuted material to pass only in a lateral direction with respect to the combine. By utilizing an auger type conveyor, we have eliminated the need for propelling the comminuted material vertically as well as horizontally. Thus the need for the amount of power required to propel the comminuted material vertically has been completely eliminated.

It will, of course, be understood that various changes may be made in the form, details, arrangement and proportions of the parts without departing from the scope of our invention.

What we claim is:

1. A stalk and straw disintegrating and scattering assembly for combines or the like having in combination, a rotor body with means of conveyance thereon and adapted to be mounted across the discharge of the combine in position to receive the stalks and straw discharged therefrom, a set of rotary cutter elements mounted for revolution on a substantially horizontal axis adjacent one end of said rotor body and co-axially therewith and receiving stalks and straw fed axially into same by said rotor body, a set of cooperating cutter elements mounted in close-working relationship with said rotary cutter elements for efficient disintegration of such stalks and straw, rotary scattering mechanism co-axial with said body and receiving the discharge of said cutter elements for scattering the output particles from said cutter elements at the side of the combine, said scattering mechanism including a rotor body propelling, when in operation, the output particles from said cutter elements outwardly along its axis and directed to the side of the combine, and mechanism for connecting said rotor body and said rotary cutter elements to a source of rotary power for driving the same at high speeds, each of said rotors having spiral flanges mounted thereon and extending continously outwardly therefrom to effectively move the straw axially of said rotor bodies.

2. A stalk and straw disintegrating and scattering assembly for combines or the like having in combination rotary means of lateral conveyance adapted to be mounted across the discharge of the combine in position to receive the stalks and straw discharged therefrom, a set of rotary cutter elements mounted for revolution immediately adjacent one end of said means in a plane normal to the axis of rotation thereof and receiving stalks and straw fed axially into same by said means, a set of cooperating cutter elements mounted adjacent said rotary cutter elements for close cutting cooperation therewith to disintegrate such stalks and straw, mechanism for connecting said set of rotary cutter elements with a rotary source of power for driving said elements at high speed, and rotary scattering mechanism mounted coaxially with said cutter elements and receiving disintegrated material therefrom, said scattering mechanism including positive scattering elements mounted for revolution on a horizontal axis and operable to convey and scatter the disintegrated material received from said cutter elements in a continuous and mainly transverse path with respect to the combine.

3. The structure defined in claim 2, each of said means of lateral conveyance, said cutter elements and said scattering mechanism being mounted on a single horizontal shaft extending transversely of the combine.

4. A stalk and straw disintegrating and scattering assembly for combines or the like having in combination rotary means of lateral conveyance adapted to be mounted across the discharge of the combine in position to receive the stalks and straw discharged therefrom, a set of generally S-shaped rotary cutter elements mounted for revolution immediately adjacent one end of said means in a plane normal to the axis of rotation thereof and rotating therewith and receiving stalks and straw fed axially into same by said rotary means, a set of cooperating cutter elements mounted adjacent said rotary cutter elements in close working relationship for cooperation therewith to disintegrate such straw, mechanism for connecting said set of rotary cutter elements and said means with a rotary source of power for driving said elements at high speed and rotary mechanism coaxial with said means propelling the disintegrated particles of stalks and straw mainly transversely with respect to the combine to scatter the same.

5. A stalk and straw disintegrating and scattering assembly for combines or the like having in combination, a frame adapted to be mounted upon a combine adjacent the discharge thereof, a single pair of spaced bearings mounted on said frame, a shaft mounted for rotation in said bearings and extending transversely across the discharge of the combine, a relatively smooth drum mounted on said shaft directly to the rear of the combine and having conveyor elements thereon extending continuously outwardly from said drum, a set of rotary cutter elements mounted on said shaft adjacent one end of said drum in a plane normal to the axis of rotation thereof and receiving stalks and straw fed axially into same by said conveyor elements, a set of cooperating cutter elements mounted on said shaft in close working relationship with said rotary cutter elements, an auger-type axially conveying and scattering mechanism mounted on said shaft laterally of said cutter elements and receiving comminuted material therefrom and axially discharging the same directly to the side of the combine and mechanism for connecting said shaft with a rotary source of power for driving said drum and said cutter elements and said auger-type conveyor at high speed to effect an efficient comminution and scattering of such stalks and straw with a minimum of power.

6. A stalk and straw disintegrating and scattering assembly for combines and the like, having in combination, rotary means of lateral conveyance, housing structure open at the top throughout its length and adapted to be mounted across the discharge of the combine in position to receive stalks and straw discharged therefrom from above and rotatably mounting said rotary means, a set of rotary cutter elements mounted for revolution on a horizontal axis at one end of said means and having free outer end portions and engaging the stalks and straw conveyed axially into same by said means, a set of fixed cooperating cutter elements mounted in close working relationship with said rotary cutter elements to disintegrate such stalks and straw, both of said sets of cutter elements being generally S-shaped to produce a more efficient disintegrating action therebetween, and mechanism for connecting said rotary cutter elements with a source of rotary power for driving said elements at high speed.

7. A stalk and straw disintegrating and scattering assembly for combines or the like having in combination, a rotor body with means of conveyance thereon adapted to be mounted across the discharge of the combine in position to receive the stalks and straw discharged therefrom, a set of generally S-shaped rotary cutter elements mounted for revolution coaxially with said body on a horizontal axis adjacent one end of said rotor body and receiving stalks and straw fed axially into same by said means of conveyance, a set of cooperating cutter elements mounted in close working relationship with said rotary cutter elements for efficient disintegration of such stalks and straw, structure for mounting said rotary cutter elements for revolution in planes transverse to the axis of said rotor body, mechanism for connecting said rotor body and said rotary cutter elements to a source of rotary power for driving the same at high speed, and rotary scattering mechanism coaxial with said body receiving the discharge from said cutter elements and scattering the output particles from said cutter elements mainly transversely and directly to the side of the combine.

8. The structure defined in claim 7, wherein said cooperating cutter elements are characterized as being in the form of fixed cutter bars extending across the full diameter of said rotor body.

9. The structure defined in claim 7, said scattering mechanism including a rotor body discharging the output particles from said cutter elements directly horizontally and transversely from the combine.

10. A stalk and straw disintegrating and scattering assembly for combines or the like having in combination, a rotor body with means of conveyance thereon and adapted to be mounted across the discharge of the combine in position to receive the stalks and straw discharged therefrom, a set of rotary cutter elements mounted for revolution on a substantially horizontal axis adjacent one end and coaxially with said body and receiving stalks and straw therefrom, a set of cooperating cutter elements mounted in close-working relationship with said rotary cutter elements for efficient disintegration of such stalks and straw, rotary scattering mechanism coaxial with said body and receiving the discharge of said cutter elements for scattering the output particles from said cutter elements at the side of the combine, said scattering mechanism including a rotor body propelling, when in operation the output particles from said cutter elements outwardly along its axis and directly to the side of the combine, and mechanism for connecting said rotor body and said rotary cutter elements to a source of rotary power for driving the same at high speeds, each of said rotors having a pair of flights of spiral flanges mounted thereon and extending continuously outwardly therefrom and disposed diametrically opposite each other to effectively balance the same.

11. A stalk and straw disintegrating and scattering assembly for combines or the like having in combination, a shaft adapted to be mounted transversely across the discharge of the combine, rotary means of lateral conveyance mounted on said shaft and extending across the discharge of the combine in position to receive the stalks and straw discharged therefrom when said shaft is so mounted, a set of rotary cutter elements mounted on said shaft at one end of said means in a plane normal to the axis of rotation thereof for revolution therewith and receiving stalks and straw fed axially into same by said means, a set of fixed cooperating cutter elements mounted in close-working relationship with said rotary cutter elements to disintegrate said stalks and straw, and rotary scattering mechanism receiving the discharge of said cutter elements for scattering of the output particles from said cutter elements at the side of the combine, said scattering mechanism including a rotor body mounted on said shaft immediately adjacent said cutter elements and propelling the output particles from said cutter elements longitudinally along its axis and directly transversely of the combine.

References Cited in the file of this patent

UNITED STATES PATENTS

| | | |
|---|---|---|
| 3,938 | Royer | Mar. 12, 1845 |
| 891,299 | Smith | June 23, 1908 |
| 1,464,621 | Kemp | Aug. 14, 1923 |
| 1,508,716 | Ochs | Sept. 6, 1924 |
| 1,524,887 | Ronning et al. | Feb. 3, 1925 |
| 1,616,303 | Campbell | Feb. 1, 1927 |
| 1,690,904 | Laemmel | Nov. 6, 1928 |
| 1,697,925 | McKay | Jan. 8, 1929 |
| 2,213,906 | Ebersol | Sept. 3, 1940 |
| 2,241,252 | Garland | May 6, 1941 |
| 2,327,893 | Hobson | Aug. 24, 1943 |
| 2,340,457 | Dion | Feb. 1, 1944 |
| 2,496,493 | Raney | Feb. 7, 1950 |
| 2,677,550 | Berger et al. | May 4, 1954 |